3,730,941
POLYIMIDES FROM TETRAHYDROFURAN-2,3:4,5-TETRACARBOXYLIC ACID DIANHYDRIDES

William M. Alvino, Pittsburgh, Pa., assignor to Westinghouse Electric Corporation, Pittsburgh, Pa.
No Drawing. Filed Aug. 9, 1971, Ser. No. 170,274
Int. Cl. C08g 20/32
U.S. Cl. 260—47 CP          10 Claims

ABSTRACT OF THE DISCLOSURE

Imide polymers prepared from tetrahydrofuran-2,3:4,5-tetracarboxylic dianhydride and diamine, preferably aromatic diamine and most desirably 4,4'-diaminodiphenyl ether.

---

The present invention relates to imide polymers prepared by use of tetrahydrofuran-2,3:4,5-tetracarboxylic dianhydride. It provides imide polymers having good adhesive properties and curable in nearly colorless films.

Polymers having imide linkages are generally known in the art. They are characterized by their high tensile strength, toughness, good dielectric properties, and excellent thermal stability. These properties make them particularly well-suited for use as self-supporting films, adhesives, molding and laminating resins, and fibers. These polymers have not, however, been generally known for their bonding properties. Only a few specific imide compositions have been found to possess good adhesive properties. Some such compositions are set forth in application Ser. No. 97,334, filed Dec. 11, 1970, assigned to the same assignee as the present application.

Imide polymers are also characterized by their deep amber color. For this reason they are undesirable or impossible to use in some applications, e.g. certain self-supporting films or in liquid crystal technology. Attempts have been made to make colorless and nearly colorless imide films by use of dianhydrides and diamines of exceptionally high (i.e. "exhaustive") purity, but they have not been generally successful.

The present invention is directed to overcome these disadvantages and difficulties with imide polymers. It provides an imide polymer which has good adhesive qualities and forms colorless or nearly colorless films.

The present invention provides an imide polymer prepared from tetrahydrofuran-2,3:4,5-tetracarboxylic dianhydride and a diamine. Diamines suitable for use in the present invention can be aliphatic, cycloaliphatic, heterocyclic or aromatic. It is preferred, however, that the aromatic diamines be used because they provide polymers of greater heat stability, which is of particular importance in making films. In addition, diamines should be selected such that they are not sterically hindered and in turn prevent the formation of high molecular weight polymer.

The aromatic diamine preferred for use in the present invention is 4,4'-diaminodiphenyl ether (DAPE). Other aromatic diamines contemplated to be suited for use in the invention are: 1,3-diaminobenzene (MPD), 4,4'-diaminodiphenylmethane (MDA), 3,4'-diaminobenzanilide (MABPPD), 1,4-diaminobenzene, 4,4'-diaminodiphenyl sulfide, 2,2-bis(4-aminophenyl) propane, 1,4-diaminonaphthalene, 4,4'-diaminobiphenyl, and 3,3'-dichloro-4,4'-diaminodiphenyl (benzidine), 4,4' - diaminodiphenyl fone, 4,4'-diaminodiphenyl sulfone, 4,4'-diaminodiphenyl aminodiphenyl N-phenyl amine, 3,3'-diaminodiphenyl sulfone, 4,4$_2$-diaminodiphenyl sulfone, 4,4'-diaminodiphenyl diethylsilane and 4,4'-diaminodiphenyl diphenylsilane. These various aromatic diamines can also be used in mixtures with each other and/or with other aromatic diamines to form homopolymers and copolymers.

In the preparation of the imide polymer of the present invention, preferably one mole of tetrahydrofuran-2,3: 4,5-tetracarboxylic dianhydride is reacted with one mole of aromatic diamine. High yields are obtained from such stoichiometric proportions. While variations from the stoichiometric amounts are possible, substantially lower yields are generally obtained where there is an excess of more than 5% of one of the monomers. Moreover, such excess may cause reduction in the molecular weight of the polymer. Accordingly, it is preferred that the molar ratio of tetrahydrofuran-2,3:4,5-tetracarboxylic dianhydride to diamines be as near 1:1 as practical, and desirably within five (5) percent of that ratio.

The imide polymers are preferably made by condensing the tetrahydrofuran-2,3:4,5-tetracarboxylic dianhydride with a diamine in a selected solvent to produce a soluble polyamic acid. The desired final shape or coating is formed from the polyamic-acid intermediate. The polyamic-acid solution is then dehydrated and cured by the use of heat and, in some instances, a chemical dehydrating agent such as acetic anhydride. A chemical dehydrating agent is generally not utilized; in certain molding operations, however, it has been found that a dehydrating agent is useful to precipitate an imide polymer from solution.

Solvents found to be preferable for use as the polymerization media are N,N'-dimethylformamide, N,N'-dimethylacetamide or N-methylpyrrolidone. Other solvents typical of this selected class include: diethylformamide, N,N'-diethylacetamide, N,N'-dimethylmethoxy acetamide, N - methyl caprolactam, dimethylsulfoxide, tetramethylene urea, pyridine, dimethylsulfone, hexamethylphosphoramide, tetramethylene sulfone, methanamide, N-methylformamide, butyrolactone and N-acetyl-2-pyrrolidone. These solvents can also be used in combination with other solvents such as benzene, xylene, toluene, dioxane and cyclohexane, or used in admixture with each other. These solvents provide a media not only for polymerization but also for forming the desired shapes or coatings. They are removed by evaporation or diffusion during the final cure.

Illustrative of the reactions involved in the present invention is the formation of imide polymer from tetrahydrofuran-2,3:4,5-tetracarboxylic dianhydride and 4,4'-diaminodiphenyl ether:

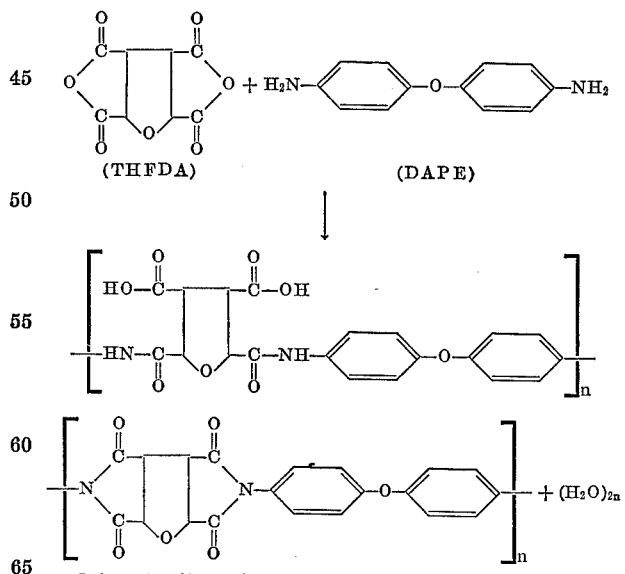

Other details, objects, and advantages of the invention will be apparent from the following non-limiting examples:

EXAMPLE 1

12 grams of 4,4'-diaminodiphenyl ether is dissolved in 75 cc. of N,N'-dimethylacetamide (DMAC). Over a 30- minute period, 12.75 grams of tetrahydrofuran-2,3:4,5-tetracarboxylic dianhydride is added to the solution. The temperature of the solution was maintained between 25–38° C. while the tetrahydrofuran dianhydride was added. The reaction was continued until maximum viscosity was reached. The resulting solution contained 24.8% solids at a viscosity of X+ on the Gardner scale.

EXAMPLE 2

Films about 1.2 mils thick were cast from the solution of Example 1 and cured at 300° C. The films were tough, creaseable, and showed coloration. The mechanical properties of the films were as follows:

| | |
|---|---|
| Tensile strength _____ p.s.i._ _ | 10,042 |
| Elongation _____ percent_ _ | 5.8 |
| Fold endurance (1 kg. load) _ _ . _____ cycles_ _ | 7,495 |

EXAMPLE 3

Flms about 1.2 mils thick were cast from the solution of Example 1 and cured below 300° C. The films were almost colorless and possessed essentially the same physical properties as the films of Example 2.

EXAMPLE 4

Example 1 was repeated using purified 4,4′-diaminodiphenyl ether (recrystallized from acetone). The resulting solution contained 25% solids at a viscosity of Y on the Gardner scale.

EXAMPLE 5

Thin films were casted from the solution of Example 4 and cured at 300° C. The films were creaseable and showed coloration.

EXAMPLE 6

Thin films were casted from the solution of Example 4 and cured at 275° C. Again nearly colorless films were obtained.

EXAMPLE 7

The polymer of Example 4 was tested for its adhesive properties. The solution was spread on the surfaces of Kapton™ films having dry thicknesses between about 0.2 and 0.4 mil. The solutions were then partially cyclized (i.e. "B" staged) by curing at 100° C. for 10 minutes, 150° C. for 10 minutes, 200° C. for 10 minutes and thereafter 250° C. for 5 minutes. Prepared surfaces were then sandwiched together and the Kapton™ films sandwiched between layers of asbestos which in turn were sandwiched between layers of silicone rubber. One laminate was bonded in a press at 275° C. and 250 p.s.i. for 15 minutes. Another laminate was bonded in a press at 285° C. and 150 p.s.i. for 15 minutes.

Both samples formed good bonds. When subjected to a "T" type peel test, peel strengths greater than 20 oz./inch width were obtained before the Kapton™ films tore, i.e., the peel strength exceeded the tear strength of the Kapton™ film.

It was also observed that the solution exhibited good flow characteristics in spreading them on the Kapton™ films. For this reason, the invention is suitable for certain molding applications.

EXAMPLE 8

For comparison, a conventional polyamic acid solution was prepared from 4-chloroformyl phthalic anhydride (TMAC) and 4,4′-diaminodiphenyl ether (DAPE). Kapton™ films were thereafter spread with the solution, "B" staged, and bonded together under the same conditions as those set forth in Example 7. The resultant amide-imide polymer exhibited only negligible bond strengths.

EXAMPLE 9

For comparison, a conventional polyamic-acid solution was prepared from 1,2:4,5-benzenetetracarboxylic dianhydride (PMDA) and 3,4′-diaminobenzanilide (MAB-PPD). The solution was spread on copper substrates. The solutions were "B" staged at 100° C. and 150° C. Laminates were formed and cured. The cure schedule was 15 minutes at 250° C. and 100 p.s.i. The resultant film of imide polymer peeled and blistered badly, and exhibited no bond strength.

EXAMPLE 10

The films of Example 2 were tested for heat stability. The films were subjected to thermogravimetric analysis in both nitrogen and air atmospheres. In nitrogen, initial decomposition occurred at 300° C., 10% weight loss occurred at 430° C., slow decomposition occurred between 430° C. and 800° C., and weight loss leveled out at about 53% above 800° C. In air, initial decomposition occurred at about 280° C., 10% weight loss occurred at 410° C., fairly rapid decomposition occurred between 410° C. and 650° C., and the weight loss at 650° C. was 95%.

It was concluded from this test that the thermal and oxidative stability of the imide polymers of the present invention are lower than conventional imide polymers prepared from aromatic diamines. This result is to be expected because of the presence of aliphatic bonds in the molecules. It is however the aliphatic bonds together with the heterocyclic oxygen which is believed to give the present invention its distinctive properties.

What is claimed:

1. A polyamic-acid consisting essentially of the uncured reaction product of tetrahydrofuran-2,3:4,5-tetracarboxylic dianhydride and a compound selected from the group consisting of aliphatic diamines, cycloaliphatic diamines, heterocyclic diamines, aromatic diamines, and mixtures thereof.

2. A polyamic-acid according to claim 1 wherein said compound is an aromatic diamine.

3. A polyamic-acid according to claim 2 wherein said aromatic diamine is 4,4′-diaminodiphenyl ether.

4. A polyimide consisting essentially of the cured reaction product of tetrahydrofuran-2,3:4,5-tetracarboxylic dianhydride and a compound selected from the group consisting of aliphatic diamines, cycloaliphatic diamines, heterocyclic diamines, aromatic diamines, and mixtures thereof.

5. A polyimide according to claim 4 wherein said compound is an aromatic diamine.

6. A polyimide according to claim 5 wherein said aromatic diamine is 4,4′-diaminodiphenyl ether.

7. A polyimide film made by
   (1) preparing a solution of reactants which comprise:
      (a) tetrahydrofuran - 2,3:4,5-tetracarboxylic dianhydride, and
      (b) a compound selected from the group consisting of aliphatic diamines, cycloaliphatic diamines, heterocyclic diamines, aromatic diamines, and mixtures thereof;
   (2) reacting said reactants to form a polyamic-acid;
   (3) forming a layer of said solution;
   (4) evaporating said solvent and curing said polyamic-acid to form a polyimide.

8. A film according to claim 7 wherein said compound is an aromatic diamine.

9. A film according to claim 8 wherein said aromatic diamine is 4,4′-diaminodiphenyl ether.

10. A film according to claim 7 wherein said curing is done by heating said polyamic-acid at less than 300° C.

References Cited

UNITED STATES PATENTS

| | | | |
|---|---|---|---|
| 3,179,634 | 4/1965 | Edwards | 260—78 |
| 3,534,067 | 10/1970 | Rempfer et al. | 260—347.3 |

WILLIAM H. SHORT, Primary Examiner

L. L. LEE, Assistant Examiner

U.S. Cl. X.R.

117—138.8 R, 161 R; 161—205, 227; 260—30.2, 30.6 R, 30.8 R, 30.8 DS, 32.2, 32.4, 32.6 N, 33.2 R, 78 TF